United States Patent
Kristinsson et al.

(10) Patent No.: US 9,145,864 B2
(45) Date of Patent: Sep. 29, 2015

(54) STOP/START VEHICLE AND METHOD FOR CONTROLLING ENGINE OF SAME

(75) Inventors: Johannes Geir Kristinsson, Ann Arbor, MI (US); Hai Yu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 555 days.

(21) Appl. No.: 13/492,208

(22) Filed: Jun. 8, 2012

(65) Prior Publication Data
US 2013/0332054 A1 Dec. 12, 2013

(51) Int. Cl.
G06F 19/00 (2011.01)
G06G 7/70 (2006.01)
F02N 11/08 (2006.01)

(52) U.S. Cl.
CPC ..... F02N 11/0837 (2013.01); F02N 2200/0801 (2013.01); F02N 2200/123 (2013.01); F02N 2200/125 (2013.01); Y02T 10/48 (2013.01)

(58) Field of Classification Search
CPC ............... Y02T 10/48; F02N 11/0837; F02N 2200/123; F02N 2200/104; F02N 11/0822; F02N 2200/125
USPC .......... 123/179.1, 179.4, 179.3; 701/112, 113
See application file for complete search history.

(56) References Cited

U.S. PATENT DOCUMENTS

| | | | |
|---|---|---|---|
| 7,079,940 B2 * | 7/2006 | Scholt et al. ................... | 701/112 |
| 2004/0159479 A1 * | 8/2004 | Morimoto et al. ........... | 180/65.3 |
| 2005/0228553 A1 | 10/2005 | Tryon | |
| 2007/0112494 A1 | 5/2007 | Naik et al. | |
| 2010/0191446 A1 * | 7/2010 | Mc Donald et al. .......... | 701/113 |
| 2011/0112740 A1 * | 5/2011 | Hashimoto ...................... | 701/70 |
| 2012/0095670 A1 * | 4/2012 | Piggott ......................... | 701/112 |
| 2012/0136553 A1 * | 5/2012 | Takeuchi et al. .............. | 701/102 |
| 2012/0191330 A1 * | 7/2012 | Nitz et al. ..................... | 701/113 |
| 2013/0110374 A1 * | 5/2013 | Boesch ......................... | 701/102 |

* cited by examiner

*Primary Examiner* — Mahmoud Gimie
*Assistant Examiner* — Sizo Vilakazi
(74) *Attorney, Agent, or Firm* — David B. Kelley; Brooks Kushman P.C.

(57) ABSTRACT

A stop/start system of a vehicle can issue auto stop commands and auto start commands. An engine of the vehicle is auto stopped in response to the auto stop commands and auto started in response to the auto start commands. The stop/start system can prevent an auto stop of the engine based on a predicted stop duration for a predicted stop location for the vehicle such that the engine remains running when the predicted stop duration is less than a threshold duration and the vehicle is stopped in a vicinity of the predicted stop location.

15 Claims, 2 Drawing Sheets

STOP/START VEHICLE AND METHOD FOR CONTROLLING ENGINE OF SAME

TECHNICAL FIELD

This disclosure relates to strategies for issuing auto stop inhibit commands in micro-hybrid or stop/start vehicles.

BACKGROUND

A micro-hybrid or stop/start vehicle can selectively turn its engine off during portions of a drive cycle to conserve fuel. As an example, a stop/start vehicle can turn its engine off while the vehicle is stopped rather than allow the engine to idle. The engine can then be restarted, for example, when a driver releases the brake pedal or steps on the accelerator pedal.

SUMMARY

A vehicle includes an engine and a stop/start system. The stop start system issues auto stop commands and auto start commands. The engine is auto stopped in response to the auto stop commands and auto started in response to the auto start commands. The stop/start system selectively prevents an auto stop of the engine based on a predicted stop duration for a predicted stop location such that the engine remains running when the predicted stop duration is less than a threshold duration and the vehicle is stopped in a vicinity of the predicted stop location. The stop/start system can selectively allow an auto stop of the engine based on the predicted stop duration for the predicted stop location such that the engine is stopped when the predicted stop duration is greater than the threshold duration and the vehicle is stopped in a vicinity of the predicted stop location. The predicted stop duration can depend on a current time of day or a current day of week. The threshold duration can depend on an amount of fuel used to auto start the engine.

An engine of a stop/start vehicle is controlled by selectively preventing an auto stop of the engine based on a predicted stop duration for a predicted stop location such that the engine remains running when the predicted stop duration is less than a threshold duration and the vehicle is stopped in a vicinity of the predicted stop location. The engine can be further controlled by selectively allowing an auto stop of the engine based on the predicted stop duration for the predicted stop location such that the engine is stopped when the predicted stop duration is greater than the threshold duration and the vehicle is stopped in a vicinity of the predicted stop location. The predicted stop duration can depend on a current time of day or a current day of week. The threshold duration can depend on an amount of fuel used to auto start the engine.

A stop/start vehicle includes an engine and one or more controllers. The one or more controllers prevent an auto stop of the engine when vehicle speed is approaching zero based on whether a current location of the vehicle is proximate a known stop location such that the engine remains running when the vehicle is stopped proximate the known stop location and a predicted stop duration for the known stop location is less than a threshold duration. The one or more controllers can further allow an auto stop of the engine when vehicle speed is approaching zero based on whether the current location of the vehicle is proximate the known stop location such that the engine is stopped when the vehicle is stopped proximate the known stop location and the predicted stop duration for the known stop location is greater than the threshold duration. The predicted stop duration can depend on a current time of day or a current day of week. The threshold duration can depend on an amount of fuel used to auto start the engine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As mentioned above, a micro-hybrid or stop/start vehicle can selectively turn off its engine during a drive cycle. These auto stop events typically take place while vehicle speed is approximately zero, e.g., while the vehicle is stopped at an intersection. Net fuel is only conserved, however, if the engine stop is of sufficient duration because considerable fuel can be used during the engine auto start process. That is if the engine is stopped for only a brief time, more fuel could be expended during the restart process than saved during the stop event.

Decisions to initiate engine stops are typically made without regard to stop duration as stop duration is unknown. In contrast, certain systems, processes, methods, and/or algorithms disclosed herein predict stop duration and use this information to determine whether to permit an engine auto stop. As an example, historical data is kept regarding stop durations for various vehicle stop locations. This data is used to predict a stop duration for a current vehicle location. If the predicted stop duration is greater than a threshold stop duration, the engine auto stop is not inhibited. If the predicted stop duration is less than the threshold stop duration, the engine auto stop could be inhibited. As another example, historical data is kept regarding stop duration for various vehicle locations and corresponding times of day. This data is then used to predict a stop duration for a current vehicle location and time of day, etc. Other scenarios are also contemplated.

Figure 1:
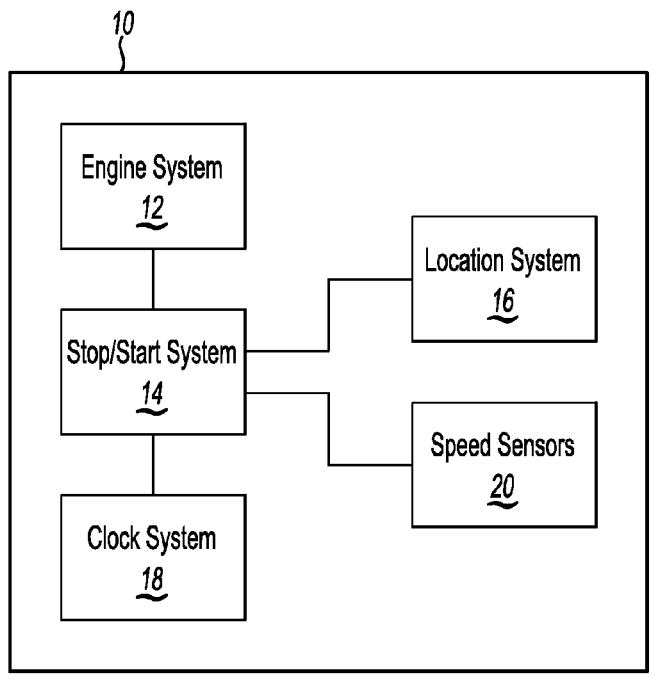
FIG. 1 is a diagrammatic representation of a micro-hybrid vehicle.

Referring to FIG. 1, a stop/start vehicle 10 includes an engine system 12 (e.g., engine, powertrain control module(s), etc.), stop/start system 14 (e.g., controller(s), processors, etc.), location system 16 (e.g., navigation system, Global Positioning System (GPS), etc.), clock system 18 (e.g., timer, clock, etc.), and speed sensors 20 (e.g., wheel speed sensors, etc.) The stop/start system 14, in other embodiments, can include a clock system and/or location system. Other arrangements are also possible. The engine system 12, location system 16, clock system 18, and speed sensors 20 are in communication with/under the control of the stop/start system 14 as indicated by thin line. That is, the stop/start system 14 can receive information about/issue commands to the engine system 12 and collect/receive location data, time/day of week data, and speed data from the location system 16, clock system 18, and speed sensors 20 respectively. Moreover, the stop/start system 14 can issue auto stop commands (e.g., commands to stop the engine during a drive cycle) and auto start commands (e.g., commands to start the engine during a drive cycle) to the powertrain system 12. The powertrain system 12 will auto stop the engine in response to auto stop commands as known in the art. Likewise, the powertrain system 12 will auto start the engine in response to auto start commands as known in the art.

Figure 2:
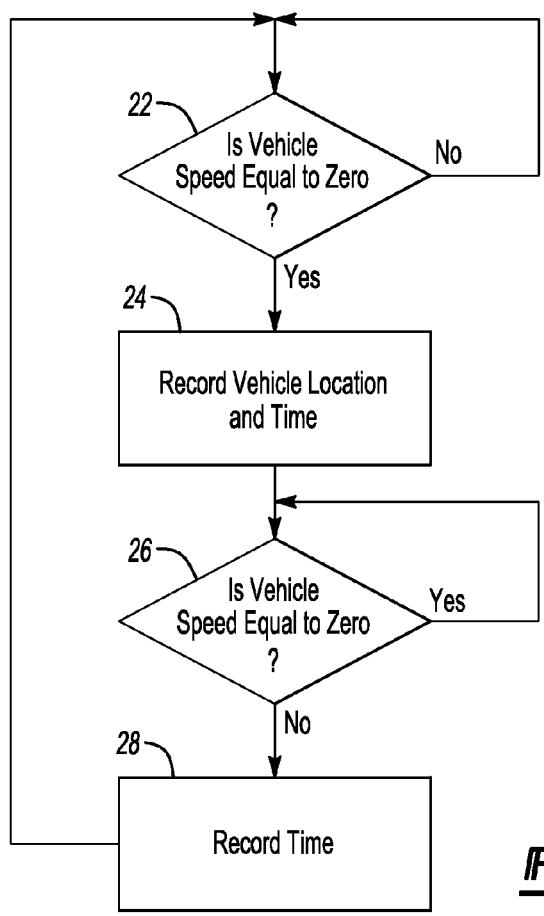
FIG. 2 is a flow chart depicting an algorithm for generating records of vehicle location and corresponding vehicle stop duration.

Referring to FIG. 2, it is determined whether vehicle speed is equal to zero at operation 22. The stop/start system 14, for example, can read data available from the speed sensors 20. If no, the algorithm returns to operation 22. If yes, current location and time data are recorded at operation 24. The stop/start system 14, for example, can read data available from the location and clock systems 16, 18 respectively and create a record in a database listing the current location and time. At operation 26, it is determined whether vehicle speed is equal to zero (that is, is the vehicle still stopped?) If yes, the algorithm returns to operation 26. If no, current time data is recorded at operation 28. The stop/start system 14, for example, can add another current time entry to the record created at operation 24. The algorithm then returns to operation 22.

Instead of checking whether vehicle speed is equal to zero at operation 26, a check could be made as to whether the vehicle speed has exceeded a predetermined threshold to determine whether the vehicle has started moving. Changes in vehicle location could also be used. Multiple stop locations that are within close proximity to each other (which could result from stopping and starting while moving toward a stop sign) can be assigned a single set of coordinates corresponding, for example, to the stop sign. The first stop coordinates could be used as the common stop location, the last stop coordinates could be used as the common stop location, etc.

Table 1 illustrates example data records created according to the algorithm of FIG. 2. At each stop location (represented as an x-y coordinate), a stop time and start time are recorded.

TABLE 1

Vehicle Location and Corresponding Time Data

| Location | Stop Time | Start Time |
|---|---|---|
| $X_1, Y_1$ | 15:26:03 | 15:26:06 |
| $X_2, Y_2$ | 8:00:07 | 8:00:27 |
| $X_1, Y_1$ | 14:48:53 | 14:48:54 |
| $X_2, Y_2$ | 7:35:19 | 7:36:00 |

A difference between the start and stop times, for a given location, yields the stop duration. The stop durations can be averaged to determine an expected or predicted stop duration for each location. For example, the 3 second and 1 second stop durations for $X_1, Y_1$ have an average of 2 seconds. Hence, the predicted stop duration for $X_1, Y_1$, if encountered again, is 2 seconds. Time of day can also be considered in determining predicted stop duration. Data collected in the morning for a given location, for example, can be aggregated (e.g., averaged, etc.) to determine an expected stop duration for that location in the morning. Data collected in the afternoon for a given location can be aggregated (e.g., averaged, etc.) to determine an expected stop duration for that location in the afternoon, etc. In other examples, day of the week and/or other information can further be collected to refine/improve the predicted stop duration determination.

Figure 3:
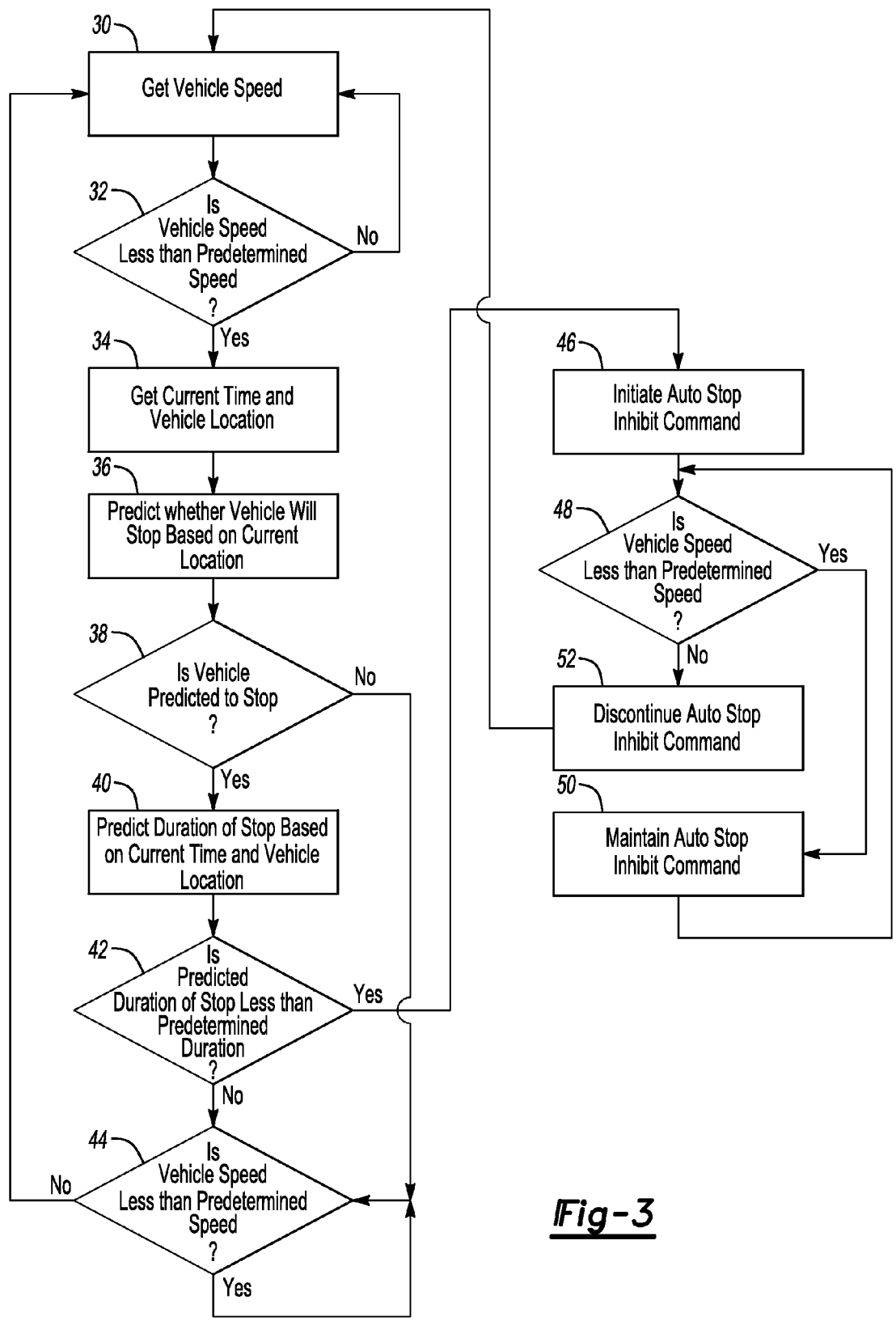
FIG. 3 is a flow chart depicting an algorithm for determining whether to issue an auto stop inhibit command.

Referring to FIG. 3, vehicle speed can be retrieved at operation 30. The stop/start system 14, for example, can read speed data available on a vehicle network from the speed sensors 20. At operation 32, it is determined whether vehicle speed is less than a predetermined speed. The stop/start system 14, for example, can determine whether vehicle speed is less than 4 miles per hour. (The assumption in this example is that if the vehicle 10 is travelling at less than 4 miles per hour, the vehicle 10 has a high probability of coming to a stop in the immediate future. Any suitable speed threshold, however, can be used and determined based on testing, simulation, etc.) If no, the algorithm returns to operation 30. If yes, current time and vehicle location data can be retrieved at operation 34. The stop/start system 14, for example, can read time and location data available from the clock and location systems 18, 16.

At operation 36, it is determined whether a vehicle stop will occur based on the current vehicle location. Put another way, it is determined whether the current location is in a vicinity of a known stop location. Data from Table 1 along with the current vehicle location, for example, can be used to make this prediction. Table 1 includes geographic coordinates identifying previous vehicle stop locations. If the coordinates defining the current vehicle location are within a vicinity of any of the coordinates of previous stop locations, it would be reasonable to assume that the vehicle 10 is going to stop. Any suitable/known technique can be used to determine whether the current vehicle location is within the vicinity of a previous stop location. If, for example, coordinates defining a previous stop location are (10, 8), a stop zone could be defined by adding the following coordinates to the previous stop location: (2, 0) (−2, 0), (0, 2), (0, −2). This yields a square stop zone of interest having boundaries whose center points are defined by the coordinates (12, 8), (8, 8), (10, 10), (10, 6). This process would be repeated for all previous stop locations. If the current vehicle location falls within any of the stop zones, it can be assumed that the vehicle 10 will stop. If the current vehicle location is (11, 9), a comparison of this location to the example coordinates reveals that it falls within the square stop zone defined above. The optimal size (and shape, etc.) of the stop zones can be determined via testing or simulation, and could be a function of the speed threshold discussed with reference to operation 32: the greater the speed threshold, the larger the optimal stop zone. Other scenarios, however, are also contemplated. The distance between the current vehicle location and all known stop locations can be determined using known techniques. If any one of the computed distances is less than a threshold distance, such as 15 meters, it can be assumed that the current location belongs to that known stop location.

At operation 38, it is determined whether the vehicle is predicted to stop at a known stop location. The stop/start system 14, for example, can make this determination based on the information generated at operation 36. If no, the algorithm proceeds to operation 44. If data is not available to predict stop duration because, for example, the vehicle 10 lacks a stop duration record for a particular location, the algorithm waits until the vehicle 10 begins moving so as to not interrupt operation of default stop/start functionality. If yes, the duration of the predicted stop is estimated based on the current time and vehicle location at operation 40. The vehicle's current stop zone defines the geographic coordinates of the predicted stop location. These coordinates can then be used to identify the associated average stop duration for those coordinates for a particular time of day as discussed with reference to Table 1. As also discussed above, other and/or different factors (e.g., day of week, etc.) aside from vehicle location can also be used to refine the predicted stop duration determination. That is, stop duration for a particular location could be different on Monday through Friday compared with Saturday and Sunday.

At operation 42 it is determined whether the predicted stop duration is less than a predetermined stop duration threshold. The predetermined stop duration threshold can be determined via testing or simulation, for example, and be set to that time necessary to ensure that the fuel saved during the engine stop will be greater than the fuel consumed during the engine auto start process. The stop/start system 14, for example, can compare the predicted stop duration to a threshold stop duration of 6 seconds. If the predicted stop duration is greater than the predetermined stop duration threshold, the algorithm proceeds to operation 44, at which it is determined whether vehicle speed is less than a predetermined speed. This predetermined speed can be the same as or different than the predetermined speed discussed with reference to operation 32. If no, the algorithm returns to operation 30. If yes, the algorithm stays at operation 44. Hence, the algorithm waits until the vehicle 10 starts moving.

Returning to operation 42, if yes, an auto stop inhibit command is initiated at operation 46. The stop/start system 14, for example, can set an engine auto stop inhibit flag. The presence of this flag can prevent the stop/start system 14 from issuing an auto stop command to the engine system 12. At operation 48, it is determined whether vehicle speed is less than a predetermined speed. If yes, the auto stop inhibit command is maintained at operation 50. The algorithm then returns to operation 48. If no, the auto stop inhibit command is discontinued at operation 52. The stop/start system 14, for example, can remove the engine auto stop inhibit flag. The algorithm then returns to operation 30.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    an engine; and
    a stop/start system configured to issue auto stop commands and auto start commands, wherein the engine is auto stopped in response to the auto stop commands and auto started in response to the auto start commands and wherein the stop/start system selectively prevents an auto stop of the engine within a stop zone around a known stop location based on a speed of the vehicle being less than a threshold speed and a predicted stop duration for the known stop location being less than a threshold duration, wherein a size of the stop zone is based on the threshold speed.

2. The vehicle of claim 1 wherein the stop/start system selectively allows an auto stop of the engine within the stop zone based on the speed being less than the threshold speed and the predicted stop duration being greater than the threshold duration.

3. The vehicle of claim 1 wherein the predicted stop duration depends on a current time of day.

4. The vehicle of claim 1 wherein the predicted stop duration depends on a current day of week.

5. The vehicle of claim 1 wherein the threshold duration depends on an amount of fuel used to auto start the engine.

6. A method for controlling a stop/start vehicle comprising:
    selectively preventing an auto stop of an engine within a stop zone around a known stop location based on a speed of the vehicle being less than a threshold speed and a predicted stop duration for the known stop location being less than a threshold duration, wherein a size of the stop zone is based on the threshold speed.

7. The method of claim 6 further comprising selectively allowing an auto stop of the engine within the stop zone based on the speed being less than the threshold speed and the predicted stop duration being greater than the threshold duration.

8. The method of claim 6 wherein the predicted stop duration depends on a current time of day.

9. The method of claim 6 wherein the predicted stop duration depends on a current day of week.

10. The method of claim 6 wherein the threshold duration depends on an amount of fuel used to auto start the engine.

11. A stop/start vehicle comprising:
    an engine; and
    one or more controllers configured to prevent an auto stop of the engine within a stop zone around a known stop location based on a speed of the vehicle being less than a threshold speed and a predicted stop duration for the known stop location being less than a threshold duration, wherein a size of the stop zone is based on the threshold speed.

12. The stop/start vehicle of claim 11 wherein the one or more controllers are further configured to allow an auto stop of the engine within the stop zone based on the speed being less than the threshold speed and the predicted stop duration being greater than the threshold duration.

13. The stop/start vehicle of claim 12 wherein the predicted stop duration depends on a current time of day.

14. The stop/start vehicle of claim 12 wherein the predicted stop duration depends on a current day of week.

15. The stop/start vehicle of claim 12 wherein the threshold duration depends on an amount of fuel used to auto start the engine.

* * * * *